United States Patent [19]
Levy et al.

[11] Patent Number: 5,276,757
[45] Date of Patent: Jan. 4, 1994

[54] FILLING COMPOSITIONS FOR OPTICAL FIBER CABLE AND CABLE CONTAINING THE SAME

[75] Inventors: Alvin C. Levy, Atlanta; Jerry J. Patterson, Duluth, both of Ga.

[73] Assignees: Alvin C. Levy and Associates, Chamblee; Master Adhesives, Norcross, both of Ga.

[21] Appl. No.: 879,767

[22] Filed: May 6, 1992

[51] Int. Cl.$^5$ .............................................. G02B 6/44
[52] U.S. Cl. ................................. 385/109; 385/100; 106/285; 106/287.23; 106/287.34; 523/173
[58] Field of Search .............. 106/285, 287.23, 287.34; 385/100, 109, 110, 111, 112, 113; 523/173

[56] References Cited

U.S. PATENT DOCUMENTS

| | | | |
|---|---|---|---|
| 4,370,023 | 1/1983 | Lange et al. | 350/96 |
| 4,701,016 | 10/1987 | Gartside, III et al. | 385/109 |
| 4,844,575 | 7/1989 | Kinard et al. | 385/113 |
| 4,852,965 | 8/1989 | Mullin et al. | 385/101 |
| 4,971,419 | 11/1990 | Gartside et al. | 385/106 |
| 5,050,959 | 9/1991 | Randisi | 385/100 |
| 5,082,348 | 1/1992 | Gartside, III et al. | 385/111 |
| 5,187,763 | 2/1993 | Tu | 523/173 |

FOREIGN PATENT DOCUMENTS 0067009 12/1982 European Pat. Off. ........ H01B 7/28

OTHER PUBLICATIONS

Martin C. Light, Jr., "An Oil Separation Test to Predict Elevated-Temperature Drip Performance of Optical Cable Buffer Tube Filling Compounds", *International Wire & Cable Symposium Proceedings*, pp. 459-464 (1988).

T. Hattori et al., "Optimal Design of Jelly Compound for Optical Cable," *International Wire & Cable Symposium Proceedings*, pp. 12-15 (1988).

Primary Examiner—John D. Lee
Assistant Examiner—John Ngo
Attorney, Agent, or Firm—Needle & Rosenberg

[57] ABSTRACT

The instant invention relates to a filling composition for optical fiber cable, and a fiber optic cable comprising a protective jacket carrying a fiber optic element therein and the filling composition, in which the filling composition comprises hydrophobic fumed silica; an organic oil; and a thermal oxidative stabilizer, wherein the stabilizer is at most monofunctional with respect to ability to hydrogen bond with the fumed silica. Preferably, the thermal oxidative stabilizer is a hindered phenol and the organic oil, which preferably is a polyalkene oil or a mixture of polyalkene oils, has a viscosity of greater than about 1000 cps at 25° C. The organic oil comprises at least one molecular weight fraction; preferably, the maximum molecular weight for each fraction of the organic oil is less than about 4000 and at least about 80% by weight of the molecules in the organic oil have a minimum molecular weight of about 800.

29 Claims, 2 Drawing Sheets octadecyl 3-(3',5'-di-tert-butyl-4'-hydroxyphenyl) propionate octadecyl 3-(3',5'-di-tert-butyl-4'-hydroxyphenyl) propionate thiodiethylene bis-(3,5-di-tert-butyl-4-hydroxy) hydrocinnamate

FILLING COMPOSITIONS FOR OPTICAL FIBER CABLE AND CABLE CONTAINING THE SAME

BACKGROUND OF THE INVENTION

The present invention relates to a filling composition for optical fiber cable and articles comprising the composition, particularly telecommunication cables, especially optical fiber cables.

Materials which are placed around optical fibers in optical fiber cable to provide protection against water ingress are commonly referred to as filling compounds. These compositions must possess a number of properties in order to provide protection against water without adversely influencing fiber transmission properties, often referred to as attenuation. The permissible range of these properties will also be affected by the cable design and the coatings used on the optical fiber. However, there are general principles which apply independent of cable design.

First, as discussed in U.S. Pat. No. 4,701,016, these compositions must have low critical yield stress (be very soft) in order to prevent attenuation of the fiber by a mechanism known as "microbending". Because cables are often exposed to low temperature, typical cable designs require satisfactory performance down to −40° C. For instance, with respect to low temperature stiffness, it has been shown for a slotted-core cable design that penetration as measured by ASTM D217 at −40° C. must be greater than about 180 dmm to give satisfactory fiber attenuation (T. Hattori et al., *Proceedings of the International Wire and Cable Symposium*, 12-15 (1988)). The critical yield stress of filling compositions for optical fiber telecommunications cable is generally measured at room temperature.

A second requirement with respect to attenuation is related to the swelling of the coating materials on the fiber by oils in the filling composition. This problem is generally associated with the primary (inner) coating on a dual coated optical fiber. Such swelling must be limited or the result may again be an increase in attenuation due to microbending.

Another requirement for filling compositions is that they remain in the cable (not drip out of the cable) at temperatures up to 80° C. Two of the most widely used tests in the industry to determine cable compound flow or drip are the Bell Communications Research (Bellcore) test (Bell Communications Research, Inc., *Technical Reference TR-TSY*-000020, Issue 4 (March 1989) and the Rural Electrification Authority (REA) test (Rural Electrification Administration, "Specification for Totally Filled Fiber Optic Cable—PE-90" (May 28, 1986). Further, the tendency for oil to separate from the filling compound or gel has been found to correlate to drip of the composition from a cable. Two oil separation tests have been reported by the industry: one is a centrifuge test at ambient temperature (U.S. Pat. No. 4,701,016) and the other is a high temperature oven test reported in M. C. Light, Jr., *International Wire & Cable Symposium Proceedings*, 459-464 (1988). Because these two tests were developed by manufacturers of different cable designs, there may be different passing criteria for different cable designs. For a design referred to in the trade as a loose tube or buffer tube, passage requires less than about 15% oil separation at 80° C.; this corresponds to no drip from the cable at 80° C. No industry standard has been published for the centrifuge test.

To provide the necessary yield stress properties, filling compositions are generally thixotropic greases such as those formed by blending an oil with a fumed silica and, optionally, a thermal oxidative stabilizer. The use of a hydrophobic fumed silica to gel a mineral oil is disclosed in European Patent Application Publication No. 0067009; the use of a hydrophobic fumed silica to gel polybutene having an average molecular weight of about 250 to 500 is disclosed in U.S. Pat. No. 5,050,959.

To be acceptable with regard to high temperature drip, the oils must not separate from the fumed silica/oil/stabilizer blend. To accomplish this end, high molecular weight polymers or 90° C. softening point waxes, such as those disclosed in U.S. Pat. Nos. 4,701,016 and 4,370,023, have been added to the grease to act as thickeners. Unfortunately, addition of the thickeners of these types also increases the stiffness, which may introduce microbending. In addition, dissolution of these polymers in the oil often requires a high temperature blending operation, which can add significantly to the cost of the filling composition.

In order to obtain compatibility with the fiber coatings, synthetic oils, such as poly α-olefins, have been used. An acceptable molecular weight range is disclosed in T. Hattori et al., *Proceedings of the International Wire and Cable Symposium*, 12-15 (1988). These oils, such as polyalkenes, also have inherently low pour points and, therefore, also produce materials which are capable of remaining soft at low temperature.

By far the most difficult set of properties to obtain are low critical yield stress and acceptable low temperature stiffness while retaining low oil separation necessary to prevent drip of the filling composition from the cable at 80° C. Prior art formulations have not been able to obtain, at the same time, both satisfactory low temperature performance with respect to attenuation and high temperature performance with respect to the composition not dripping out of the cable. Thus, there exists a need for an improved filling composition that is capable of remaining in a cable at high temperatures yet able to prevent unnecessary "micro-bending", particularly at low temperatures.

Throughout this application, various publications are referenced. The disclosures of these publications in their entireties are hereby incorporated by reference into this application in order to more fully describe the state of the art to which this invention pertains.

SUMMARY OF THE INVENTION

The instant invention relates to a filling composition for optical fiber cable which has a low critical yield stress, remains sufficiently soft at −40° C. so as not to introduce added attenuation to the fiber at that temperature, yet has the low oil separation necessary so as not to drip out of the cable at 80° C. In particular, the instant invention relates to a filling composition for optical fiber cable, and a fiber optic cable comprising a protective jacket carrying a fiber optic element therein and the filling composition, in which the filling composition comprises hydrophobic fumed silica; an organic oil; and a thermal oxidative stabilizer, wherein the stabilizer is at most monofunctional with respect to ability to hydrogen bond with the fumed silica. Preferably, the thermal oxidative stabilizer is a hindered phenol and the organic oil, which preferably is a polyolefin oil, in particular a polyalkene oil or a mixture of polyalkene oils, has a viscosity of greater than about 1000 cps at 25° C. and glass transition and crystallization temperatures below about −40° C. The organic oil comprises at least one molecular weight fraction; preferably, the maximum molecular weight for each fraction of the organic oil is less than about 4000 and at least about 80% by weight of the molecules in the organic oil have a minimum molecular weight of about 800.

The filling composition also can contain, optionally, mineral oil having a viscosity per ASTM D445 at 40° C. of greater than about 50 centistokes and/or an organic thickener. Preferably, at least 80% by weight of the filling composition is comprised of a combination of the fumed silica, the organic oil and the thermal oxidative stabilizer; more preferably, the organic oil comprises between approximately 75% to 95% by weight of the composition. The thermal oxidative stabilizer, which preferably is octadecyl 3-(3',5'-di-tert-butyl-4'-hydroxyphenyl) propionate, preferably comprises between approximately 0.1% to 3.0% by weight of the composition and the fumed silica preferably comprises between approximately 5% to 10% by weight of the composition.

Preferably, the organic oil comprises poly n-decene oil, a mixture of poly n-decene oils or a mixture of polybutene and poly n-decene oils, particularly polybutene oils having a molecular weight between approximately 800 and 2500 and poly n-decene oils having a molecular weight between approximately 800 and 3500. Particularly useful are filling compositions in which the organic oil contains approximately 35% to 100% by weight poly n-decene oil or a mixture of poly n-decene oils. Preferred filling compositions comprise either approximately 5% to 9% by weight hydrophobic fumed silica; approximately 10% to 40% by weight polybutene oil (or mixtures) having a molecular weight between approximately 800 and 2500; approximately 50% to 85% by weight poly n-decene oil (or mixtures) having a molecular weight 800 and 3500; and approximately 0.1% to 1.5% by weight of octadecyl 3-(3',5'-di-tert-butyl-4'-hydroxyphenyl) propionate or approximately 5% to 9% by weight hydrophobic fumed silica; approximately 89% to 95% by weight poly n-decene oil having a molecular weight between approximately 800 and 3500; and approximately 0.1% to 1.5% by weight of octadecyl 3-(3',5'-di-tert-butyl-4'-hydroxyphenyl) propionate. Most preferred is a filling composition comprising approximately 5% to 9% by weight hydrophobic fumed silica; approximately 10% to 25% by weight polybutene oil having an average molecular weight of about 2300; approximately 50% to 85% by weight poly n-decene oil having an average molecular weight of about 1300; and approximately 0.1% to 1.5% by weight of octadecyl 3-(3',5'-di-tert-butyl-4'-hydroxyphenyl) propionate.

DETAILED DESCRIPTION

Figure 1:
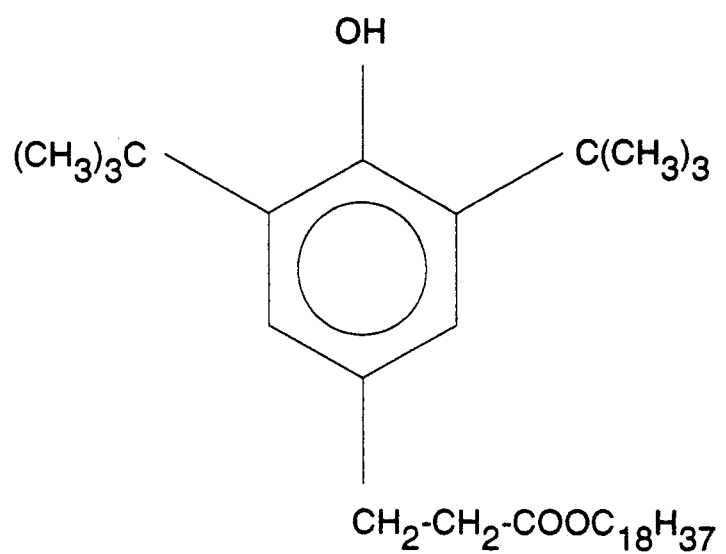
FIG. 1 shows the chemical structure of octadecyl 3-(3',5'-di-tert-butyl-4'-hydroxyphenyl) propionate.

The compositions according to the invention can advantageously be used as fiber optic cable filling compounds. The compositions satisfy the various requirements for such a composition, including possessing a low critical yield stress, remaining sufficiently soft at −40° C. so as not to introduce added attenuation to the fiber at that temperature, and having the low oil separation necessary so as not to drip out of the cable at 80° C. These composition are, preferably, non-toxic and provide sufficient lubricity or cushioning for a fiber optic element, or series of elements, placed within a protective jacket so as to cause minimal or no interference with the optical properties of the fiber optic elements contained within the jacket.

The filling compositions of the instant invention are physically thixotropic gels in which a three dimensional chicken-wire type network formed by the fumed silica traps the organic oil in the network cage. The fumed silica network is held together by hydrogen bonds, which exist between pairs of residual hydroxyl groups on the surfaces of the fumed silica particles. The hydrogen bonds act as weak crosslinks in the gel structure of the filling composition. When the gel structure is disrupted, the hydrogen bonds are broken and the gel flows. As the hydrogen bond density increases in the gel structure, the force required to cause the gel to flow increases. Thus, the greater the hydrogen bond density, the higher the critical yield stress.

What has not been recognized by prior art is that any other component which can further serve as a hydrogen bonding bridge between the hydroxyl groups on the fumed silica surface will also increase the force required to move the gel and, therefore, also increase the critical yield stress. The instant invention discloses that it is important that thermal oxidative stabilizers, even those which are present at very low in concentration in a filling composition, not contribute to hydrogen bond crosslinking. Therefore, in order to not increase crosslinking in the gel structure, these stabilizers can be at most monofunctional with respect to hydrogen bonding.

Thus, the instant invention recognizes the importance of the choice of the thermal oxidative stabilizer to the critical yield stress and, therefore, microbending performance. This choice is particularly important in formulations which have an organic oil, with or without organic thickeners, in which the viscosity of the organic oil, with or without organic thickeners, at room temperature is above about 1000 centipoises (cps). Typically, this condition exists in formulations designed for low oil separation, with resultant low drip, at 80° C.

Stabilizers typically are present at a concentration of less than 1% by weight in prior are filling compositions and would, therefore, appear not to be important to critical yield stress. However, thermal stabilizers such as hindered phenols are also capable of hydrogen bonding. Therefore, if the functionality of the stabilizer with respect to hydrogen bonding is greater than 1, these stabilizers will act as a crosslinking bridge between the fumed silica hydroxyl groups and produce a much stiffer (higher yield stress) product than would otherwise be obtained. Thus, in order to produce a filling composition capable of functioning satisfactorily over a broad temperature spectrum, thermal oxidative stabilizers should be limited to those that either do not participate in hydrogen bonding with the fumed silica or are monofunctional with respect to the stabilizer's ability to hydrogen bond with the fumed silica.

Further, this invention relates to the choice of organic oil used so as to produce a filling composition capable of being used over a wide temperature range. In particular, an organic oil comprising a polyolefin oil is preferred, more preferably polyalkene oil or a mixture of polyalkene oils, to obtain both the low oil separation associated with absence of cable drip and the ASTM D217 penetration required for acceptable attenuation at −40° C. The organic oil should have a viscosity at approximately 25° C. greater than about 1000 cps or greater than about 2000 cps to ensure that the filling composition will not drip from the cable at temperatures of 65° C. and 80° C., respectively. Preferred viscosities to obtain good cable drip performance at 65° C. and 80° C. range from about 2500 cps to 4000 cps at approximately 25° C.

Typically, organic oils, such as polyalkene oils, are available in the form of blends of various fractions having differing molecular weights. To obtain the low oil separation required for cable drip, the low swelling of the fiber coating needed for acceptable fiber attenuation, and the ability to mix the oils without a separate high temperature mixing step, the maximum molecular weight for each fraction of the organic oil in the filling composition of this invention is preferably less than about 4000 and at least about 80% by weight of the molecules in the organic oil have a minimum molecular weight of about 800. Thus, the compositions avoid difficulties caused by the use of high molecular weight additives, such as thickeners. Also, in order to not significantly swell the primary coating on the fiber, the percent of oils having a molecular weight below 800 should not exceed about 20%. Further, the organic oils, such as polyalkenes, should have glass transition and crystallization temperatures below −40° C. to assure the high penetration required to prevent attenuation at −40° C.

When the organic oil is a mixture of polyalkene oils, the composition ratio of the two oils will depend upon the respective molecular weights of the oils being blended. For instance, in considering a blend of polybutene polymerized from a polyisobutylene rich polybutene stream and poly n-decene, polybutene oil is less likely to separate from the gel network than is the poly n-decene oil of the same molecular weight because of their respective molecular structures. Therefore, the functional ratio of a 1300 average molecular weight poly n-decene oil and a 2300 average molecular weight polybutene oil ranges from about 90/10 to 70/30, dependent somewhat on the design requirement for the cable. For a polybutene oil having an average molecular weight of 1300, the ratio differs, for example, to 75/25 to 50/50. Likewise, if the molecular weight of the poly n-decene oil differs significantly from 1000, the ratio will change. For instance, a suitable oil for the filling composition can comprise from about 50% to 100% poly n-decene oil having an average molecular weight of about 3070 with the balance being a poly n-decene oil having an average molecular weight of about 1300. Given the teachings herein, a person skilled in the art would be able to prepare other appropriate formulations.

In addition to providing the advantageous and neccessary properties as discussed above, the instant invention provides two other distinct advantages over prior art filling compositions. First, lower raw material cost can be achieved by selecting a less expensive polyalkene to be a major consituent of the organic oil. For instance, polybutene oils are much less costly than poly n-decene and other synthetic polymers used as thickeners. The second advantage is lower processing costs. Heat is not required to mix the polyalkene oils to form the organic oil. In contrast, a separate costly mixing step at elevated temperatures is required to dissolve the prior art thickeners.

As used herein, the term "organic oil" refers to synthetic or natural petroleum derived oils, including olefin oils, alkene oils, napthenic oils and paraffinic oils and chlorinated olefin, alkene, napthenic and paraffinic oils, especially including polyolefin oils, such as polyalkene and poly α-olefin oils. Preferred oils useful in the practice of the invention include poly n-decene oil, a mixture of poly n-decene oils and a mixture of poly n-decene oil and polybutene hydrocarbon oil. Small amounts, up to about 15% of the organic oil, of mineral oil having a viscosity at 40° C. per ASTM D445 of greater than about 50 centistokes may also be added, particularly for some applications in which cable design requirements are not as stringent. The polybutene oils should have a specific gravity at 60°/60° F. of between 0.88 and 0.92 and a pour point per ASTM D97 of less than about 20° C. The poly n-decene oil should have a specific gravity at 60°/60° F. of between about 0.83 and 0.87 and a pour point (ASTM D97) of less than about −20° C. Mineral oils should have a minimum specific gravity at 60°/60° F. of about 0.86 to 0.88 and a pour point per ASTM D97 of less than about −12° C. Oils useful in the practice of this invention include a polybutene oil (pour point per ASTM D97 of 18° C., SUS viscosity (ASTM D445) of 19,700 at 99° C., specific gravity at 60°/60° F. of 0.898 to 0.916, average molecular weight of 2300) sold under the trade name INDOPOL H1900 (Amoco Chemicals Corporation, Chicago, Ill.), a polybutene oil (pour point per ASTM D97 of 2° C., SUS viscosity (ASTM D445) of 3000 at 99° C., specific gravity at 60°/60° F. of 0.887 to 0.904, average molecular weight of 1290) sold under the trade name INDOPOL H300 (Amoco Chemicals Corporation), a poly n-decene oil (pour point per ASTM D97 of −40° C., specific gravity at 60°/60° F. of 0.852, viscosity at 40° C. per ASTM D445 of 399 centistokes and an average molecular weight of 1300 sold under the trade name MOBIL SHF-401 (Mobil Chemical Corporation, Edison, N.J.), a poly n-decene oil (pour point per ASTM D97 of −23° C., specific gravity at 15.6°/15.6° C. of 0.850, viscosity at 40° C. per ASTM D445 of 1350 centistokes and an average molecular weight of 3070 sold under the trade name MOBIL SHF-1001 (Mobil Chemical Corporation) and a mineral oil (specific gravity at 60/60 F of 0.876 and pour point per ASTM D97 of −12° C.) sold under the trade name DRAKEOL 35 (Penreco, a division of Penzoil Corporation, Butler, Pa.).

The fumed silica preferably is hydrophobic and has a BET surface area of between 70 and 300 m²/gm. An example of a hydrophobic fumed silica useful in the practice of the invention is a dimethyl dichlorosilane coated fumed silica having a BET surface area between 90 and 130 m²/gm and an ignition loss (2 hours at 1000 degrees C.) of less than 2.0% sold under the trade name AEROSIL R972 (Degussa Corporation, Dublin, Ohio).

The thermal oxidative stabilizer can be any compound capable of functioning as a thermal oxidative stabilizer in the instant filling composition so long as it is no more than monofunctional with respect to participation in hydrogen bonding with the fumed silica in the fumed silica network. The preferred oxidative stabilizers of the instant invention are hindered phenols that have a solubility in the organic oil of at least approximately 0.1% by weight, preferably at least 1% by weight, and are monofunctional with respect to hydrogen bonding with the fumed silica network. Examples of stabilizers useful in the practice of the invention include octadecyl 3-(3′,5′-di-tert-butyl-4′-hydroxyphenyl)

propionate; N-(3,5-di-tert-butyl-4-hydroxy)hydrocinnamoyl-N'-(3,5-di-tert-butyl)hydroxycinnamoyl diamine: ethoxy(3,5-di-tert-butyl-4-hydroxy)hydrocinnamoyl ethoxy(3,5-di-tert-butyl) hydrocinnamoyl sulfide; 1-oxy(3,5-di-tert-butyl-4-hydroxy)hydrocinnamoyl-6-oxy(3,5-di-tert-butyl)hydrocinnamoyl-hexane; and [methylene (3,5-di-tert-butyl-4-hydroxy-hydrocinnamate] tris[methylene (3,5-di-tert-butyl-hydrocinnamate] methane. The preferred thermal oxidative stabilizer is octadecyl 3-(3',5'-di-tert-butyl-4'-hydroxyphenyl) propionate, which is sold under the trade name IRGANOX 1076 (Ciba-Geigy Corporation, Ardsley, N.Y.).

The composition according to the invention contains from about 5 to 10%, preferably from 6.5 to 8.5%, by weight fumed silica. The organic oil constitutes from about 80 to 95%, preferably 90 to 94%, by weight of the composition. The preferred composition of the oil mixture will depend on the molecular weights of the respective oils and the design requirements of the final application as discussed above. In any combination, the viscosity of the oil mixture should not be less then about 1000 centipoises. The filling composition contains from about 0.1 to 2.0%, preferably from about 0.2 to 1.5%, by weight of the thermal oxidative stabilizer depending on the thermal enviroment of the end use.

The filling composition may also contain small amounts of additional substances so as to increase the beneficial properties of the composition. For instance, small amounts of dyes, rust inhibitors, organic thickeners and surfactants can also be added.

The filling compositions of this invention may be formed by mixing the components in a high shear mixer preferably equipped with a vacuum port. Ideally, the mixer should have the capability of varying the shear so as to obtain maximum dispersion of the fumed silica without over shearing the composition. The procedure is to first add the oils and the thermal stabilizer to the mixer. The thermal stabilizer can be dissolved in a small portion of the oil at elevated temperature before addition to the mixer. The fumed silica is then added and slowly worked into the bulk of the solution. The shear is then increased and a vacuum is drawn on the mixer so that air is not trapped in the blend. Typically, dependent on the mixer design and the composition, the blending time is about 15 minutes. Other procedures for forming these compounds are obvious to those skilled in the art.

The present invention is more particularly described in the following Example which is intended as illustrative only since numerous modifications and variations therein will be apparent to those skilled in the art.

EXAMPLE

Tables 1 and 2 shows various properties of ten formulations, A through J, which were prepared, generally, as described above, to illustrate how the choice of monofunctional versus difunctional stabilizers effect critical yield stress and viscosity. Evaluation of the properties for these compositions illustrate the parameters involved in formulating an appropriate organic oil and selecting a thermal oxidative stabilizer for a filling composition. To eliminate effects of lot to lot variation in the components of the formulations, each component was restricted to one lot of material. This restriction is particularly important with respect to the fumed silica, which can vary widely from lot to lot.

Figure 2:
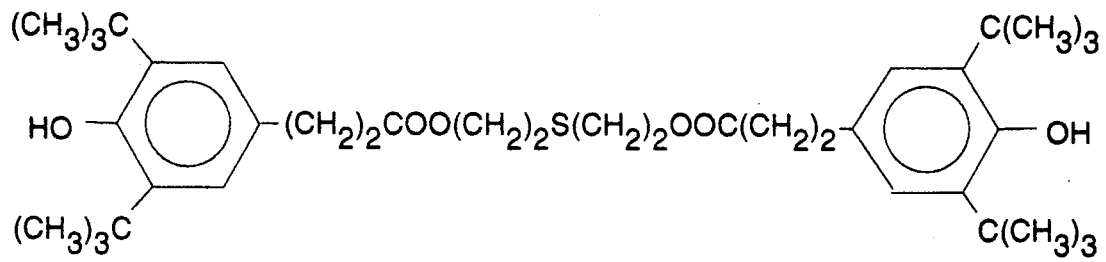
FIG. 2 shows the chemical structure of thiodiethylene bis-(3,5-di-tert-butyl-4-hydroxyl) hydrocinnamate.

The structures of the two contrasting stabilizers are shown in FIGS. 1 and 2. FIG. 2 shows thiodiethylene bis-(3,5-di-tert-butyl-4-hydroxyl) hydrocinnamate, which is sold under the trade name IRGANOX 1035 (Ciba-Geigy Corporation), and is difunctional (has two hydroxyl groups) with respect to the hydrogen bonding. FIG. 1 shows that IRGANOX 1076 has only one hydroxyl group and, therefore, is only monofunctional in respect to hydrogen bonding. As shown, in Table 1, the critical yield stress increases dramatically when employing the difunctional material, even at concentrations as low as 0.2% by weight. The critical yield stress of 55 Pa at the 0.2% by weight IRGANOX 1035 level is too high for many applications. Generally, above 35 Pa, added attenuation due to microbending starts to become a problem depending on cable design. The higher the critical yield stress, the more severe the problem. In the case of the 0.2% IRGANOX 1035 addition level, the oxidative induction time is too low for some applications, thereby necessitating an even higher addition level.

As discussed above, in addition to possessing an appropriate room temperature critical yield stress, the stiffness of a filling composition at −40° C., the lower temperature design limit for optical fiber cable, must not be too large. In particular, the ASTM D217 Penetration at −40° C. should be greater than about 180 dmm. As can be seen in Table 1, the penetration of these compositions exceed 180 dmm.

Oil separation data is also reported in Table 1 for compositions containing either IRGANOX 1076 and IRGANOX 1035. As can be seen, even though IRGANOX 1035 significantly stiffens the gels through crosslinking, the oil separation at the 1.0% by weight IRGANOX 1035 concentration significantly increases. The oil separation of the IRGANOX 1076-containing compositions in the centrifuge test correlates with oil separation data in the 80° C. oven test and the viscosity data for oil mixtures reported in Table 2. Composition C passes 65° C. drip, but is marginal at 80° C. Composition E passes 80° C. These data agree with the published requirement of less than 15% oil separation in the 80° C. oven test to pass cable drip at 80° C. Based on the correlation of cable drip performance with oil mixture viscosity, the minimum viscosity of the oil mixtures for passage of cable drip would be about 1000 cps for the 65° C. drip performance and in the range of 2000 cps for 80° C. performance.

The data for formula J in Table 1 illustrate properties for a composition in which the organic oil is totally poly n-decene. These properties would indicate that satisfactory compositions can be achieved solely with oils comprised of poly n-decene and that the thickeners described in the prior art are not required.

The data in Tables 1 and 2 clearly indicate the negative impact of the crosslinking of the IRGANOX 1035 on both the critical yield stress and the oil separation of optical fiber cable filling compositions. Furthermore, the examples given clearly show how satisfactory materials can be formulated according to the present invention.

The critical yield stress values given herein were measured with a Brookfield RVT Viscometer, using T-bar spindles and a helipath stand. This apparatus is the same as used to measure the compound viscosity. In measuring the critical yield stress, the helipath stand and the spindle drive are simultaneously turned off after an equilibrium viscosity is attained. The force on the spring attached to the spindle is then allowed to decay until the force required to move the gel is equal to the force on the spring. At this point the decay ceases. This reading directly gives the critical yield stress if the geometry of the spindle and the torque on the spring are known. To obtain the data presented, the critical yield stress was taken from a calibration curve constructed with the Brookfield viscometer and spindle employed above and using compounds having a known critical yield stress. These numbers agreed reasonable with calculated numbers based on the geometry of the spindle and the spring constant.

The centrifuge data in Table 1 corresponds to separation after 2 hours at 15,000 rpm in an Servall Type SS4 centrifuge with a SS34 rotor. The drip data in Table I was obtained by filling a 12 inch long tube of the loose tube design with the test composition. The tube also contained one optical fiber which extended approximately 0.5 inches from the end of the tube. The tube was suspended vertically in a test oven for 24 hours. Tests were run at 65° C. and 80° C., the cable drip temperatures specified by Bellcore Corporation and the REA respectively. An aluminum weighing pan was placed under the tube. In order to pass the test, no gel or oil could drip into the pan over the 24 hour test period. Compositions which passed 80° C. were not tested at 65° C.

Oxidative induction times were measured according to procedures known in the art. The sample was heated in a Perkin Elmer DSC4 differential scanning calorimeter to 200° C. under $N_2$, at which time the gas was switched to $O_2$. The time until onset of the exotherm was then determined.

tion except as and to the extent that they are included in the accompanying claims.

What is claimed is:

1. A filling composition for optical fiber cable, comprising:
    a) hydrophobic fumed silica;
    b) an organic oil; and
    c) a thermal oxidative stabilizer, wherein the stabilizer is at most monofunctional with respect to ability to hydrogen bond with the fumed silica.

2. The filling composition of claim 1, wherein the thermal oxidative stabilizer is a hindered phenol.

3. The filling composition of claim 2, wherein the thermal oxidative stabilizer is octadecyl 3-(3′,5′-di-tert-butyl-4′-hydroxyphenyl) propionate.

4. The filling composition of claim 1, wherein the organic oil has a viscosity of greater than about 1000 cps at 25° C.

5. The filling composition of claim 1, wherein the organic oil comprises at least one molecular weight fraction and wherein the maximum molecular weight for each fraction of the organic oil is less than about 4000 and wherein at least about 80% by weight of the molecules in the organic oil have a minimum molecular weight of about 800.

6. The filling composition of claim 1, wherein the organic oil is a polyalkene oil or a mixture of polyalkene oils.

7. The filling composition of claim 6, wherein the organic oil is selected from the group consisting of a poly n-decene oil, a mixture of poly n-decene oils and a

TABLE 1

| | A | B | C | D | E | F | G | H | I | J |
|---|---|---|---|---|---|---|---|---|---|---|
| Materials | Compositions (% by weight) | | | | | | | | | |
| FUMED SILICA (Aerosil R972) | 7.5 | 7.5 | 7.5 | 7.5 | 7.5 | 7.5 | 7.5 | 7.5 | 7.5 | 7.5 |
| POLY-n-decene; MW ≈ 1300 (SHF-401) | | | 65.5 | 65.5 | 71.5 | 71.5 | 72.3 | 55.0 | 91.5 | 27.5 |
| POLY-n-decene; MW ≈ 3070 (SHF-1001) | | | | | | | | | | 64.0 |
| POLYBUTENE; MW ≈ 2300 (H1900) | | | 14.0 | 14.0 | 20.0 | 20.0 | 20.0 | | | |
| POLYBUTENE; MW ≈ 1300 (H300) | | | | | | | | 36.5 | | |
| MINERAL OIL (Drakeol 35) | 91.5 | 91.5 | 12.0 | 12.0 | | | | | | |
| Monofunctional OXIDATIVE STABILIZER (Irganox 1076) | 1.0 | | 1.0 | | 1.0 | | | 1.0 | 1.0 | 1.0 |
| Difunctional OXIDATIVE STABILIZER (Irganox 1035) | | 1.0 | | 1.0 | | 1.0 | 0.2 | | | |
| Properties | | | | | | | | | | |
| Viscosity, poise | 2960 | 5920 | 3280 | 5200 | 3100 | 10920 | 5360 | 3600 | 2560 | 3200 |
| Critical Yield Stress, Pa, ambient temp. | | | 25 | 60 | 20 | 115 | 55 | 25 | 25 | 30 |
| Penetration @ −40° C., dmm (ASTM D217) | 199 | | 193 | 207 | | | | 211 | 242 | 206 |
| Oil Separation, % | | | | | | | | | | |
| Centrifuge | 45 | 43 | 3.5 | 7.0 | 2.0 | 5.0 | 1.7 | 1.0 | 8.0 | 3.4 |
| 80° C., oven | | | 20 | | 12 | | | 16 | 32 | |
| OIT @ 200° C. min. (Oxidative Induction Time) | | | 89 | | 82 | 122 | 41 | | | 82 |
| Cable Drip, | | | | | | | | | | |
| @ 65° C. | | | P | | | | | | | |
| @ 80° C. | | | M | | P | | | | | |

P = Pass   M = Marginal, variable Pass & Fail

TABLE 2

| Composition | A & B | C & D | E-G | H | I | J |
|---|---|---|---|---|---|---|
| Viscosity of Oil Mixture, cps | 160 | 1600 | 2900 | 4300 | 840 | 2000 |

Although the present products have been described with reference to specific details of certain embodiments thereof, it is not intended that such details should be regarded as limitations upon the scope of the invenmixture of poly n-decene and polybutene oils.

8. The filling composition of claim 7, wherein the molecular weight of the polybutene oil is between approximately 800 and 2500 and the molecular weight of the poly n-decene oil is between approximately 800 and 3500.

9. The filling composition of claim 7, wherein the poly n-decene oil or mixture of poly n-decene oils comprise between approximately 35% to 100% by weight of the organic oil.

10. The filling composition of claim 1, wherein the organic oil further comprises mineral oil having a viscosity at 40° C. of greater than about 50 centistokes.

11. The filling composition of claim 1, wherein the fumed silica, the organic oil and the thermal oxidative stabilizer comprise at least 80% by weight of the composition.

12. The filling composition of claim 1, wherein the organic oil comprises between approximately 75% to 95% by weight of the composition.

13. The filling composition of claim 1, wherein the thermal oxidative stabilizer comprises between approximately 0.1% to 3.0% by weight of the composition.

14. The filling composition of claim 1, wherein the fumed silica comprises between approximately 5% to 10% by weight of the composition.

15. A filling composition for optical fiber cable, comprising:
   a) approximately 5% to 9% by weight hydrophobic fumed silica;
   b) approximately 10% to 40% by weight polybutene oil or a mixture of polybutene oils having a molecular weight between approximately 800 and 2500;
   c) approximately 50% to 85% by weight poly n-decene oil or a mixture of poly n-decene oils having a molecular weight between approximately 800 and 3500; and
   d) approximately 0.1% to 1.5% by weight of octadecyl 3-(3',5'-di-tert-butyl-4'-hydroxphenyl) propionate.

16. The filling composition of claim 15, comprising:
   a) approximately 5% to 9% by weight hydrophobic fumed silica;
   b) approximately 10% to 25% by weight polybutene oil having an average molecular weight of about 2300;
   c) approximately 50% to 85% by weight poly n-decene oil having an average molecular weight of about 1300; and
   d) approximately 0.1% to 1.5% by weight of octadecyl 3-(3',5'-di-tert-butyl-4'-hydroxyphenyl) propionate.

17. A filling composition for optical fiber cable, comprising:
   a) approximately 5% to 9% by weight hydrophobic fumed silica;
   b) approximately 89% to 95% by weight poly n-decene oil or a mixture of poly n-decene oils having a molecular weight between approximately 800 and 3500; and
   d) approximately 0.1% to 1.5% by weight of octadecyl 3-(3',5'-di-tert-butyl-4'-hydroxphenyl) propionate.

18. A fiber optic cable comprising a protective jacket carrying a fiber optic element therein and the filling composition of claim 17.

19. A fiber optic cable comprising a protective jacket carrying a fiber optic element therein and a filling composition, wherein the filling composition comprises:
   a) hydrophobic fumed silica;
   b) an organic oil; and
   c) a thermal oxidative stabilizer, wherein the stabilizer is at most monofunctional with respect to ability to hydrogen bond with the fumed silica.

20. The fiber optic cable of claim 19, wherein the filling composition comprises:
   a) approximately 5% to 9% by weight hydrophobic fumed silica;
   b) approximately 10% to 40% by weight polybutene oil or a mixture of polybutene oils having a molecular weight between approximately 800 and 2500;
   c) approximately 50% to 85% by weight poly n-decene oil or a mixture of poly n-decene oils having a molecular weight between approximately 800 and 3500; and
   d) approximately 0.1% to 1.5% by weight of octadecyl 3-(3',5'-di-tert-butyl-4'-hydroxphenyl) propionate.

21. The fiber optic cable of claim 19, wherein the filling composition comprises
   a) approximately 5% to 9% by weight hydrophobic fumed silica;
   b) approximately 10% to 25% by weight polybutene oil having an average molecular weight of about 2300;
   c) approximately 50% to 85% by weight poly n-decene oil having an average molecular weight of about 1300; and
   d) approximately 0.1% to 1.5% by weight of octadecyl 3-(3',5'-di-tert-butyl-4'-hydroxyphenyl) propionate.

22. A filling composition for optical fiber cable, comprising:
   a) approximately 5% to 9% by weight hydrophobic fumed silica;
   b) approximately 10% to 40% by weight polybutene oil or a mixture of polybutene oils having a molecular weight between approximately 800 and 2500;
   c) approximately 50% to 85% by weight poly n-decene oil or a mixture of poly n-decene oils having a molecular weight between approximately 800 and 3500; and
   d) approximately 0.1% to 1.5% by weight of a thermal oxidative stabilizer wherein the stabilizer is at most monofunctional with respect to ability to hydrogen bond with the fumed silica.

23. A fiber optic cable comprising a protective jacket carrying a fiber optic element therein and the filling composition of claim 22.

24. A filling composition for optical fiber cable, comprising:
   a) approximately 5% to 9% by weight hydrophobic fumed silica;
   b) approximately 10% to 25% by weight polybutene oil having an average molecular weight of about 2300;
   c) approximately 50% to 85% by weight poly n-decene oil having a molecular weight between approximately 1300; and
   d) approximately 0.1% to 1.5% by weight of a thermal oxidative stabilizer wherein the stabilizer is at most monofunctional with respect to ability to hydrogen bond with the fumed silica.

25. A fiber optic cable comprising a protective jacket carrying a fiber optic element therein and the filling composition of claim 24.

26. A filling composition for optical fiber cable, comprising:
   a) approximately 5% to 9% by weight hydrophobic fumed silica;
   b) approximately 89% to 95% by weight poly n-decene oil or a mixture of poly n-decene oils having a molecular weight between approximately 800 and 3500; and
   d) approximately 0.1% to 1.5% by weight of a thermal oxidative stabilizer wherein the stabilizer is at most monofunctional with respect to ability to hydrogen bond with the fumed silica.

27. A fiber optic cable comprising a protective jacket carrying a fiber optic element therein and the filling composition of claim 26.

28. A filling composition for optical fiber cable, comprising:
   a) approximately 5% to 9% by weight hydrophobic fumed silica;
   b) approximately 10% to 40% by weight polybutene oil having a molecular weight between approximately 800 and 2500; and
   c) approximately 50% to 85% by weight poly n-decene oil having a molecular weight between approximately 800 and 3500.

29. A fiber optic cable comprising a protective jacket carrying a fiber optic element therein and the filling composition of claim 28.

* * * * *